(12) United States Patent
Huang et al.

(10) Patent No.: US 9,079,115 B2
(45) Date of Patent: Jul. 14, 2015

(54) PROPELLER CONNECTING PIECE FOR ELECTRIC MODEL AIRPLANE

(75) Inventors: Guochuan Huang, Shanghai (CN); Yuchen Wu, Shanghai (CN)

(73) Assignee: Shanghai Nine Eagles Electronic Technology Co., Ltd., Shanghai (CN)

( * ) Notice: Subject to any disclaimer, the term of this patent is extended or adjusted under 35 U.S.C. 154(b) by 603 days.

(21) Appl. No.: 13/395,781

(22) PCT Filed: Feb. 9, 2010

(86) PCT No.: PCT/CN2010/000182
§ 371 (c)(1),
(2), (4) Date: Mar. 13, 2012

(87) PCT Pub. No.: WO2011/035525
PCT Pub. Date: Mar. 31, 2011

(65) Prior Publication Data
US 2012/0177497 A1 Jul. 12, 2012

(30) Foreign Application Priority Data

Sep. 24, 2009 (CN) ...................... 2009 2 0217171 U (51) Int. Cl.
*A63H 27/30* (2006.01)
*A63H 27/00* (2006.01)
*B64C 11/04* (2006.01)

(52) U.S. Cl.
CPC ............... *A63H 27/02* (2013.01); *B64C 11/04* (2013.01)

(58) Field of Classification Search
CPC .......... H02K 7/003; H02K 7/14; B64C 11/02; B64C 2203/00; B64C 2201/042; A63H 27/02
USPC ......... 416/2, 60, 169 R, 170 R; 415/9, 122.1, 415/123, 124.2; 464/151; 446/34, 35, 36, 446/57, 58, 59, 60, 93, 120
See application file for complete search history.

(56) References Cited

U.S. PATENT DOCUMENTS

| | | | | |
|---|---|---|---|---|
| 2,164,485 A | * | 7/1939 | Yantis | 464/37 |
| 2,254,972 A | * | 9/1941 | Mollart et al. | 464/151 |
| 2,689,617 A | * | 9/1954 | Bouley | 416/212 R |
| 2,962,312 A | * | 11/1960 | Wanner | 464/30 |
| 3,530,495 A | * | 9/1970 | Kindel | 403/140 |
| 3,718,009 A | * | 2/1973 | Perina | 464/30 |
| 3,744,180 A | * | 7/1973 | Mabuchi | 446/58 |
| 3,787,129 A | * | 1/1974 | Kohler et al. | 403/135 |
| 3,899,257 A | * | 8/1975 | Gladieux | 403/259 |
| 3,940,882 A | * | 3/1976 | Mabuchi | 446/58 |
| 4,840,601 A | * | 6/1989 | Denman | 464/157 |
| 5,615,857 A | * | 4/1997 | Hook | 248/549 |
| 7,967,684 B1 | * | 6/2011 | Schroeder | 464/139 |

* cited by examiner

*Primary Examiner* — Nathaniel Wiehe
*Assistant Examiner* — Eldon Brockman
(74) *Attorney, Agent, or Firm* — Merek, Blackmon & Voorhees, LLC (57) ABSTRACT

A propeller connecting piece for electric model airplane, for connecting an electric-power output shaft with a propeller in an electric model airplane with the propeller, characterized in that the propeller connector comprises two connectors, wherein one of the connectors is connected with the electric-power output shaft of the model airplane, and the other connector is connected with the propeller of the model airplane, one of the two connectors is an elastic component provided with an opening slot, and the two connectors are coaxially connected and can rotate together, but can be conveniently separated from each other when impacted by external force, so as to put the propeller under effective protection.

11 Claims, 9 Drawing Sheets

PROPELLER CONNECTING PIECE FOR ELECTRIC MODEL AIRPLANE

TECHNICAL FIELD

The present invention relates to the technical field of model airplane, especially to the technical field of an electric model airplane powered by front-mounted motor.

BACKGROUND ART

Model airplanes, especially the small model airplanes powered by front-mounted motor, mostly fly on a small simple field, and typically, there is no flat runway for the small model airplanes to take off and land, and the propeller during flying is quite liable to be impacted by plenty of obstacles. In the prior art, what is generally adopted is the manner that the propeller is directly fixedly connected with the motor power output shaft (including motor main shaft or power output shaft of driven gear of motor-powered reducing gear train), therefore, during flying, especially in the process of takeoff and landing of the model airplane, once the propeller is impacted by an obstacle, in milder case, the propeller is broken, and in more serious case, the motor main shaft is bent to be out of work, and even the model airplane will be damaged.

Figure 1:
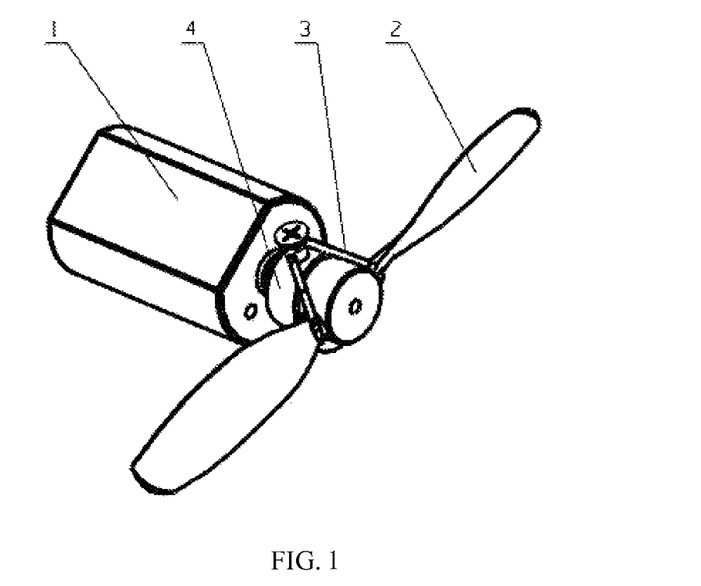
FIG. 1 is an illustrative schematic diagram of the propeller protecting connector adopting rubber band in the prior art.

In order to protect the propeller, some model amateurs use two screws for fixing a cylinder on the motor output shaft to form a propeller cushion, the propeller is sleeved on the propeller cushion, and a rubber band is sleeved on the two screws to tightly press the propeller on the propeller cushion, thus the motor drives the propeller to rotate during normal operation, and when the propeller is accidentally impacted, the rubber band tying the propeller is stretched out and broken under the action of impact moment and the propeller can be separated from the propeller cushion so as to protect the propeller to a certain degree, FIG. 1 is a schematic diagram of the connection of such a structure.

It can be seen that the propeller protecting device in the form of the rubber band is characterized by tightly pressing the propeller on the propeller cushion by using the rubber band, and the rotation of the motor drives the propeller by means of frictional force. Obviously, the transfer of rotational torque between the motor and the propeller requires quite large frictional force, and such a frictional force requires quite large pressure from the rubber band, however, when the tension force of the rubber band is relatively large, the propeller is hardly separated from the propeller cushion; in order to guarantee that the propeller is relatively easily separated from the propeller cushion when being impacted, the tension force of the rubber band tying the propeller cannot be too large. Therefore, two technical requirements in this method, i.e. transferring the rotational torque of motor and protecting the propeller from being impacted to further avoid damage, are contradictory in this simple technical proposal, so this technical measure is unsatisfactory in propeller protecting effect in practice.

Owing to the above problem, the development of front-mounted motor power model is substantially restricted, especially in the aspect of small-sized airplane.

SUMMARY OF THE INVENTION

The technical problem to be solved by the present invention is to provide a propeller connector of electric model airplane, which can, on the premise of ensuring stable and firm connection between an electric power output shaft and a propeller in the model airplane to normally transfer electric power to the propeller, separate the propeller from the electric power output shaft in time in the case of accidental impact so as to put the propeller under effective protection.

Thus, the present invention provides a propeller connector of electric model airplane, which is used for connecting an electric-power output shaft with a propeller in an electric model airplane with the propeller, the propeller connector comprises two connectors, wherein one of the connectors is connected with the electric-power output shaft of the model airplane, and the other connector is connected with the propeller of the model airplane, one of the two connectors is an elastic component provided with an opening slot, and the two connectors are coaxially connected and can rotate together, but can be conveniently separated from each other when impacted by external force;

wherein, one of the two connectors has an inner cavity shaped as a drum, the maximal diameter of the cross-sectional circumcircle at the middle of the drum-shaped inner cavity is larger than those of the cross-sectional circumcircles at the bottom and the opening, and the other connector is shaped to be tightly enclosed by the inner cavity of the connector;

wherein, one of the two connectors is provided with a convex rib(s) corresponding to the opening slot on the other connector, and the number of the convex rib(s) is at least one and at most equal to the number of the opening slot(s) on the other connector; when the two connectors are connected with each other, the convex rib is embedded into the opening slot so that the two connectors can be located and connected instead of rotating relatively, thus torque transfer between the electric power output shaft and the propeller is completed; axially slidable fit state is formed between the convex rib and the opening slot, so the convex rib slides from the interior of the opening slot to the opening of the opening slot and is then separated from the opening slot when the two connectors are separated from each other under external force;

wherein, one of the two connectors has an inner cavity shaped as two connected drums, the diameter of the cross-sectional circumcircle at the middle of each drum-shaped inner cavity is larger than those of the cross-sectional circumcircles at the bottom and the opening, and the other connector is shaped as double drums that can be tightly enclosed by the inner cavity of the connector;

wherein, the width at the opening of the opening slot is larger than or equal to that at the other end of the opening slot, and the shape of the convex rib is matched with the opening slot;

wherein, the cross sections of the two connectors are centrosymmetrical.

wherein, the cross sections of the two connectors are round, elliptical or polygonal.

wherein, when the cross section is polygonal, the opening slot of the connector is located at the corner or sideline.

wherein, the connector connected with the propeller can be integrally injection-molded with the propeller.

wherein, the model is a motor-powered model airplane.

Since the propeller connector of the model airplane provided by the present invention is used for connecting the electric power output shaft (including motor shaft and final stage driven gear shaft of motor-powered reducing system) with the propeller, the propeller connector is divided into two separable connectors, with one being connected with the propeller and the other being connected with the electric power output shaft. Embedded locking between the two connectors is realized by means of elastic deformation of the connector material so as to transfer motor power to the propeller, and when the propeller is impacted, one of the connectors is pried owing to moment to pry the other connector immediately, so the loosening of the deformed connector leads to the release of the other embedded connector. Therefore, on the premise of keeping the propeller and the electric power output shaft rotating together, the damage to the motor-powered model airplane and its power system can be avoided when the propeller is impacted, thereby making an effective breakthrough on the technical bottleneck of electric model airplane with front-mounted power.

DETAILED DESCRIPTION OF THE INVENTION

Further detailed description is made below to the embodiments of the present invention with reference to the drawings.

The connector having the function of protecting the propeller of model airplane provided by the present invention is used for connecting the electric power output shaft (including motor shaft and final stage driven gear shaft of motor-powered reducing system) with the propeller, the propeller connector comprises two separable connectors, with one being connected with the propeller and the other being connected with the electric power output shaft. The basic working principle of the connector is as follows: embedded locking between the two connectors is realized by means of elastic deformation of the connector material so as to transfer motor power to the propeller, and when the propeller is impacted, one of the connectors is pried owing to moment to pry the other connector immediately, so the loosening of the deformed connector leads to the release of the other embedded connector.

The moment required by the separation of the two connectors when the propeller is impacted is not directly associated with the transfer of rotational torque of the motor, so the requirement of these two design elements can be satisfied relatively easily during design. As for specific design, at least one of the two connectors is an elastic connector and is provided with an opening slot, and naturally, the two connectors can also be elastic connectors; both the two connectors have centrosymmetrical cross sections, e.g. round, ellipse, or round plus one or several secants, or triangle, square, hexagon, octagon, polygon and the like, however, no matter which shape the cross sections are, the two connectors are round-drum-shaped in the longitudinal direction, with the maximal diameter of the cross-sectional circumcircle at the middle of the drum-shaped inner cavity being larger than those of the cross-sectional circumcircles at the bottom and the opening; one of the connectors should be provided with the opening slot, and one of the connectors may be tightly enclosed by the inner cavity of the other connector, the two interconnected connectors are integrally fusiform.

In the present invention, the transfer of torque between the electric power output shaft and the propeller is achieved in two typical ways: 1, the cross sections of the two connectors are designed as round and the connector with no opening slot arranged thereon is provided with a convex rib, i.e. protruding edge, the convex rib is embedded into the corresponding opening slot of the other connector so that the two connectors cannot rotate and are locked; 2, the cross sections of the two connectors are designed as ellipse, or triangle with round corners, or square with round corners, or polygon, or round plus one or several secants, etc., in this case, the connector with no opening slot arranged thereon can be provided with no convex rib, the edge of one connector is locked with the opening slot on the other connector so that the two interconnected connectors form a structure that cannot rotate, thus it can be ensured that the electric power output shaft is not separated from the propeller owing to rotation under normal situation. Quite apparently, in the second case discussed above, it is acceptable to arrange the convex rib on the connector with no opening slot arranged thereon, and in the case of polygon, when the number of sides of the polygon is enough to be close to round, the convex rib must be arranged to maintain tight connection between the two connectors during their rotation.

To make it clearer, in the following embodiments for illustrating the present invention, the connector connected with the propeller is referred to as connecting plug, and the connector connected with the electric power output shaft, such as motor output shaft, is referred to as connecting socket sleeve, in addition, the connecting plug is tightly enclosed by the inner cavity of the connecting socket sleeve to realize the connection therebetween in general, but this is merely for illustrative convenience and shall not be contemplated as the limitation to the scope of the present invention.

Under the situation that the cross sections of the two connectors are non-round and no convex rib is arranged, the diameter of the connecting socket sleeve is increased under the action of torque in the process of transferring motor torque after the two connectors are interconnected, so the connecting plug does not slip inside the connecting socket sleeve only if the motor torque causes the difference between the diameter of the connecting socket sleeve prior to deformation and the diameter thereof subsequent to deformation to be smaller than one of the follows: 1, the difference between elliptical long shaft and short shaft; 2, the difference between the distance from the vertex angles of doubled polygon to the center of circle and the distance from the sides to the center of circle; and 3, the difference between the distance from the circumference to the center of circle and the distance from the secants to the center of circle, in this case, the connectors can transfer the motor torque.

The desired value of the force when the propeller is separated from the connector can be calculated through different structural forms and different materials. Therefore, no mutual influence is generated between separating force and torque transfer. Thus both adequate torque and proper separating force can be obtained, that is to say, the propeller and the motor can be effectively protected during impact while enough power can be obtained.

Figure 2:
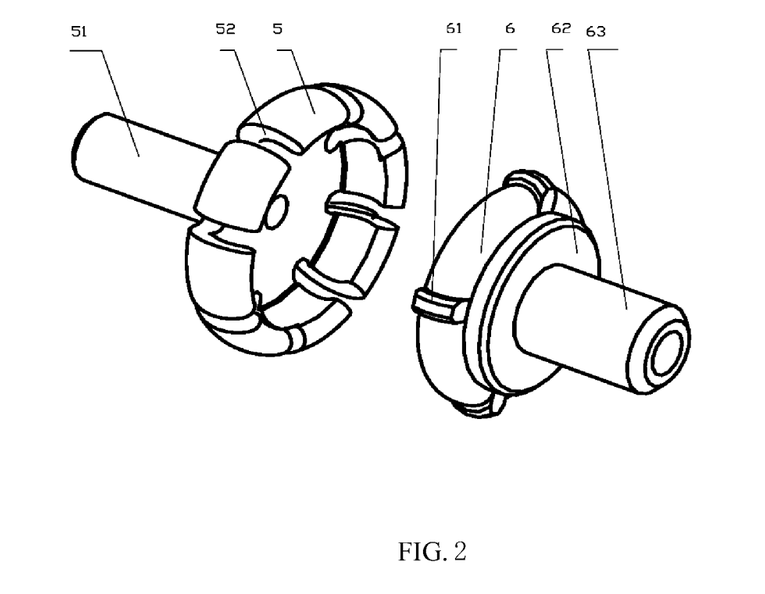
FIG. 2 is an illustrative schematic diagram of the structure of the drum-shaped connector with round cross section in one embodiment of the present invention.

In one embodiment of the present invention, the typical structure of the connecting socket sleeve is a drum-shaped structure with opening slot and round cross section of the inner cavity thereof; the typical structure of the connecting plug is a drum-shaped structure that can be tightly enclosed by the inner cavity of the connecting socket sleeve. FIG. 2 is an illustrative schematic diagram of the typical structure of the round-drum-shaped connector in one embodiment of the present invention, wherein the structure comprises a connecting socket sleeve 5 and a connecting plug 6; the connecting socket sleeve 5 is elastic and has an round-drum-shaped inner cavity with eight opening slots thereon, a shaft sleeve pipe 51 of the connecting socket sleeve is connected with the electric power output shaft; similarly, the connecting plug 6 is basically round-drum-shaped and is provided with at least one convex rib 61 thereon or convex ribs 61 thereon the number of which is equal to the number of the opening slots on the connecting socket sleeve, the convex ribs are corresponding to the opening slots on the connecting socket sleeve 5 in the aspect of position, the width of the convex rib 61 is smaller than that of the opening slot, a propeller cushion 62 is arranged at the front end of the connecting plug 6, and the propeller can be fixed with the propeller cushion 62 the in such a manner of interference fastening, gluing, screwing and the like; when the connecting socket sleeve 5 is connected with the connecting plug 6, i.e. the connecting plug 6 is embedded into the connecting socket sleeve 5, and simultaneously, the convex ribs 61 of the connecting plug are embedded into the opening slots 52, axially slidable fit state is formed between the convex ribs and the opening slots, so that the connecting plug 6 is locked inside the connecting socket sleeve 5 and cannot rotate, in order to transfer rotational torque of the motor to the propeller, however, in the process that the connecting socket sleeve 5 is separated from the connecting plug 6 because the propeller is impacted by external force, the convex ribs can slide from the interior of the opening slots to the openings of the opening slots, finally leading to the separation of the two connectors.

Figure 3A:
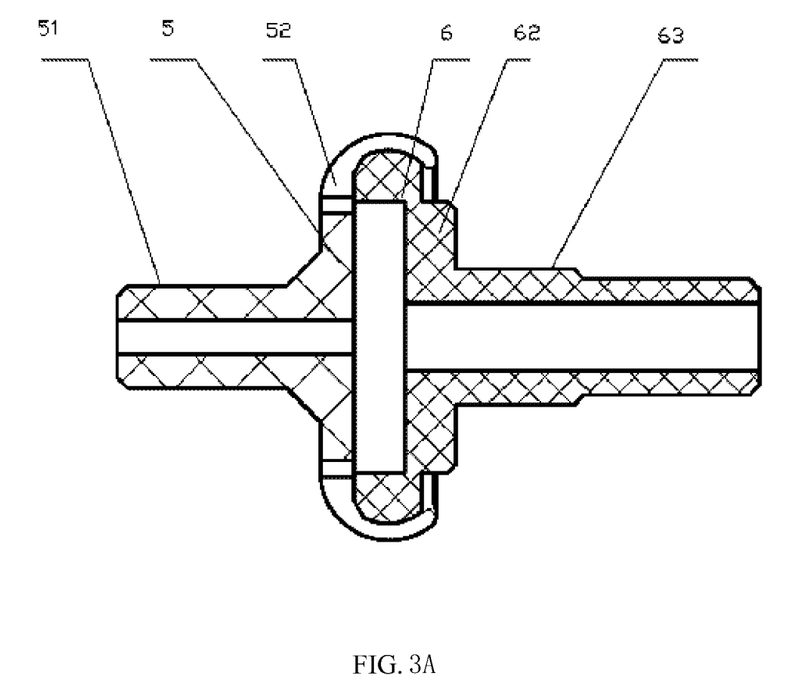
FIG. 3A is a schematic diagram of the section structure of the drum-shaped connector with round cross section in a connection state in one embodiment of the present invention.
Figure 3B:
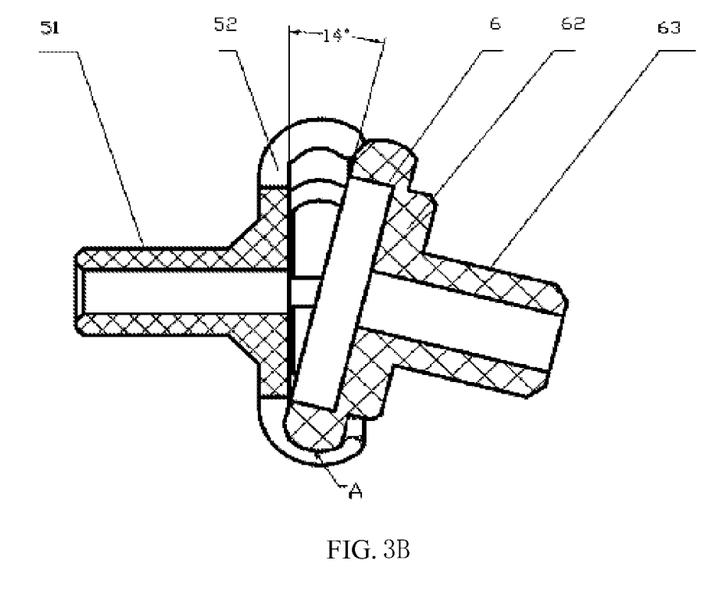
FIG. 3B is a schematic diagram of the section structure of the drum-shaped connector with round cross section in a state that the two connectors are separated under external force in one embodiment of the present invention.

FIG. 3A is a schematic diagram of the section structure of the round-drum-shaped connector in a connection state, which illustrates the state that the connecting plug 6 having the propeller cushion 62 and the propeller shaft 63 is locked by the connecting socket sleeve 5. FIG. 3B is a schematic diagram of the section structure of the round-drum-shaped connector in a state that the connecting socket sleeve is separated from the connecting plug under external force; it can be seen that, when the propeller is impacted by external force, the connecting plug 6, the propeller cushion 62 and the propeller shaft 63 are under the action of a prying moment having pivot A, and the connecting plug is separated from the connecting socket sleeve 5 when deflecting by 14 degrees.

Figure 4:
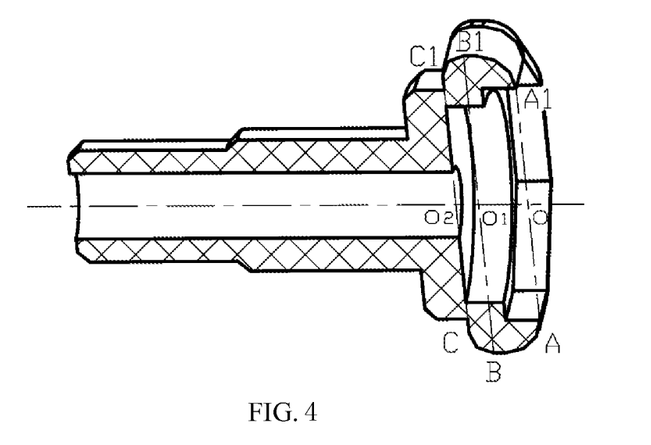
FIG. 4 is a schematic diagram of the longitudinal section structure of the drum-shaped connector with round cross section in one embodiment of the present invention.

FIG. 4 is a schematic diagram of the longitudinal section of this typical round-drum-shaped connector, which illustrates important features of this typical round-drum-shaped connector, namely, it can be seen from the longitudinal section that both the inner cavity of the connecting socket sleeve and the cross section of the connecting plug in the connector are round, the diameter B-B1 of the cross section at the middle of the connecting socket sleeve is larger than the diameters of the two end faces of the connecting plug: A-A1 and C-C1; the maximal diameter of the cross section at the middle of the drum-shaped inner cavity of the connecting socket sleeve is larger than the diameters of the cross sections at the bottom and at the opening.

In accordance with the working principle of such a connector discussed above, those ordinary skilled in this art would quite easily comprehend that, besides the shape of round drum, the inner cavity of the connecting socket sleeve and the cross section of the connecting plug may also be ellipse, and polygonal drum-shaped structure with N sides, e.g. triangle, quadrangle, hexagon, octagon and the like, wherein N is a number from 3 to infinite; only if the cross section is centrosymmetrical, for example, round with one or two secants. When the inner cavity of the connecting socket sleeve and the cross section of the connecting plug are polygonal drum-shaped structures, e.g. triangle, quadrangle, hexagon, octagon and the like, the opening slots on the connecting socket sleeve may be at the corner or sideline, and round corner transition may be formed at the corner. Different shapes of the cross section of the connector could result in different arrangements of the convex ribs, specifically, when the round cross section of the connector or the polygon with enough sides is close to round, slippage is generated between the two connectors in the process of transferring torque by an electric power rotary connection mechanism, so in this case, it is required to arrange at least one convex rib on one of the connectors to be corresponding to the opening slots on the other connector, and in other cases, the arrangement of the convex ribs on the connector with no opening slot thereon can be omitted.

Figure 5:
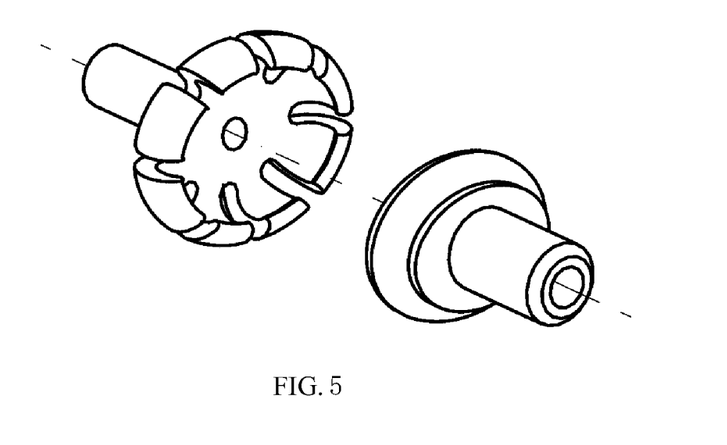
FIG. 5 is a schematic diagram of the drum-shaped connector with elliptical cross section in one embodiment of the present invention.
Figure 6:
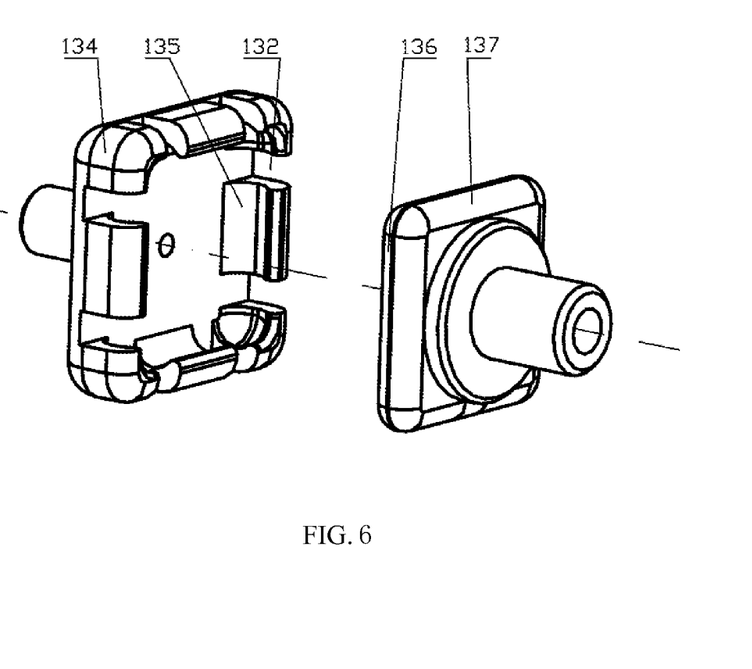
FIG. 6 is a schematic diagram of the drum-shaped connector with square cross section in one embodiment of the present invention.
Figure 7:
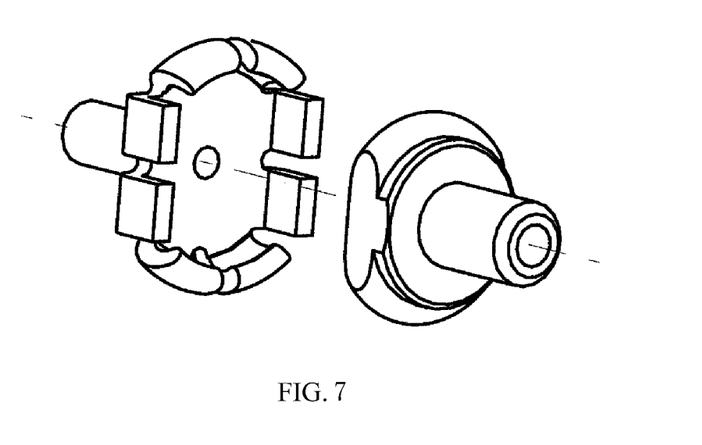
FIG. 7 is a schematic diagram of the drum-shaped connector with round cross section and having symmetrical secants in one embodiment of the present invention.
Figure 8:
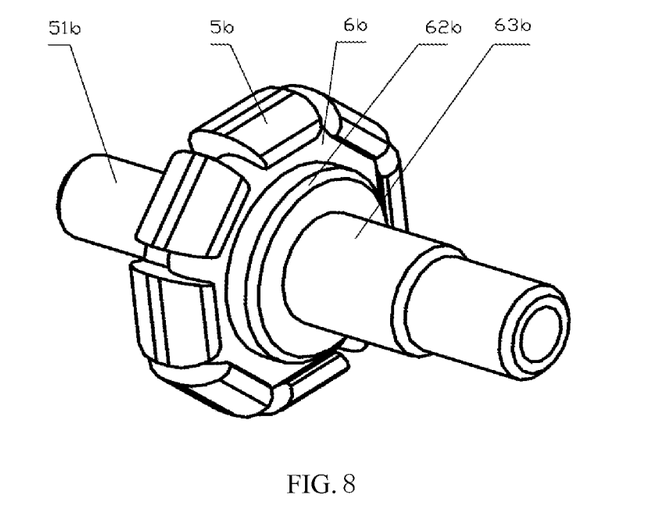
FIG. 8 is a schematic diagram of the drum-shaped connector with octagonal cross section in one embodiment of the present invention.

FIG. 5 is a schematic diagram of the connector with elliptical cross section in one embodiment of the present invention; FIG. 6 is a schematic diagram of the connector with square cross section in one embodiment of the present invention, in which the connecting socket sleeve has local parts 135 on four sides having locking effect, opening slots, and round corners 134 having no locking effect, and circular arcs 137 and right-angled sides 136 of the connecting plug are tightly locked by the local parts 135 in the connecting socket sleeve. FIG. 7 is a schematic diagram of one embodiment of the present invention with round cross section and having symmetrical secants; FIG. 8 is a schematic diagram of the structure of the round-drum-shaped connector with octagonal cross section in the present invention, in which round corners are arranged at the corners of the inner cavity of the connecting socket sleeve 5 and at eight corners of the connecting plug 6, and the octagonal connecting plug can be provided with no convex rib. The structures in such shapes also have the function of transferring rotational torque between the electric power output shaft and the propeller and the function of protecting the propeller when the propeller is impacted.

Thus, those ordinary skilled in this art could comprehend some modified structures of the present invention quite easily without any creative effort, which can be not limited to the section shapes listed above as long as the cross section of the connector is centrosymmetrical and which can realize the functions of the present invention, thus these modified structures of the present invention are contemplated as being within the scope of the present invention.

Figure 9:
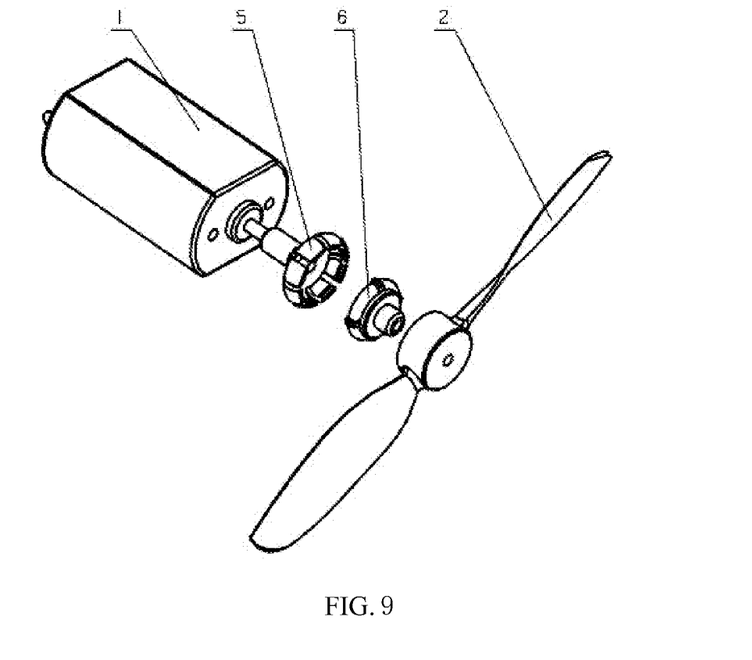
FIG. 9 is an exploded schematic diagram of the assembly of model motor, round-drum-shaped connector and propeller in one embodiment of the present invention.

FIG. 9 is an exploded schematic diagram of the assembly of motor, typical round-drum-shaped connector and propeller in one embodiment of the present invention, in which a motor 1, a connecting socket sleeve 5, a connecting plug 6 and a propeller 2 are included and which clearly shows the total structure and the assembly steps of the typical round-drum-shaped connector and the electric power of model airplane, namely, the motor output shaft and the propeller.

With regard to the connections of the two connectors with the propeller and with the electric power output shaft, in this specification, the connector connected with motor is generally the connecting socket sleeve and the connector connected with the propeller is the connecting plug. It can be known from the aforementioned embodiments that the typical round-drum-shaped connector is the connecting socket sleeve on which uniform opening slots are distributed, and the corresponding convex ribs are arranged on the connecting plug, so those skilled in this art would be aware of other modified structural forms of the two connectors quite easily.

Figure 10:
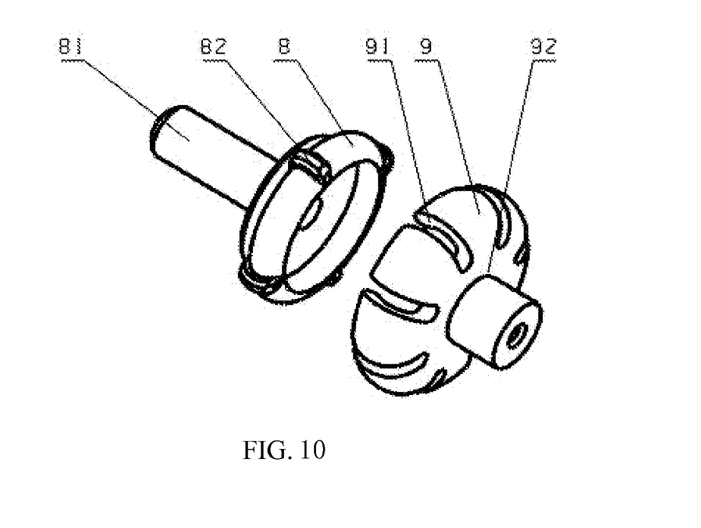
FIG. 10 is a schematic diagram of the structure of the drum-shaped connector with round cross section in another embodiment of the present invention.

FIG. 10 is a schematic diagram of the structure of the round-drum-shaped connector in another embodiment of the present invention, in which a connecting plug 8 is sleeved with a shaft sleeve 81 and an electric output shaft, a connecting socket sleeve 9 and a propeller cushion 92 are connected with the root of the propeller, the structures of the connectors are just opposite, in the horizontal direction, to those of the connecting socket sleeve and the connecting plug in FIG. 2, and its propeller protecting function is the same.

Figure 11:
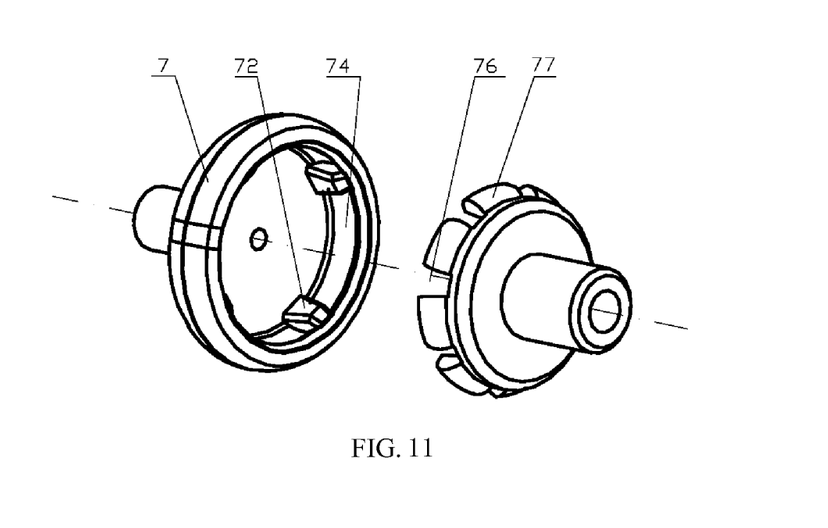
FIG. 11 is a schematic diagram of the structure of the drum-shaped connector with round cross section and trapezoidal opening slot and convex rib in further embodiment of the present invention.

FIG. 11 is also a typical structural form, in which 7 is the round-drum-shaped connecting socket sleeve with convex ribs, the diameter of the opening of the connecting socket sleeve is smaller than that of the middle part of the inner cavity, and the connecting socket sleeve is rigidly structured. A connecting plug 77 is provided with opening slots 76 so as to be elastic, and this structural form is characterized in that the outer diameter of the connecting plug 77 is under shrinkage deformation in the process that the connecting socket sleeve is separated from the connecting plug. When the propeller is impacted, a prying moment acts on the connectors, the connecting plug is separated outwards from the connecting socket sleeve, and when the maximal designed outer diameter of the connecting plug 77 is deformed to be less than the diameter of the opening of the connecting socket sleeve, the connecting plug 77 can be separated outwards from the connecting socket sleeve 7; in the proposal that the inner cavity of the connecting socket sleeve is provided with inward convex ribs, dimensional coordination between the convex rib and the opening slot must comply with the follows: when the maximal designed diameter of the connecting plug is changed to the opening of the connecting socket sleeve, the width of the convex rib should be less than the width of the shrunk opening slot; it can be obtained through analysis that the opening of the opening slot has larger degree of deformation than the bottom of the opening slot during the shrinkage deformation of the opening slots on the connecting plug, thus it is more reasonable to design the opening slots and the convex ribs in the trapezoidal structure: the width of the opening of the opening slot is larger than that of the bottom of the opening slot, and the width of the convex rib at the opening of the rigid connecting socket sleeve is smaller than the dimension of the bottom of the connecting socket sleeve.

In the round-drum-shaped connector having the connecting plug 77 with the opening slots 76 thereon, the width of the opening of the opening slot 76 of the connecting plug is larger than the trapezoid having the same width as the bottom; an inner cavity 74 of the connecting socket sleeve 7 is provided with convex ribs 72 in the trapezoidal shape, and the width of the convex rib 72 at the opening of the connecting socket sleeve is smaller than that of the bottom of this convex rib; the connecting plug 77 is pried under the action of moment to slide out of the connecting socket sleeve 7, the process of sliding gradually from the maximal diameter part at the middle of the connecting plug 77 to the opening of the connecting socket sleeve is the process that the outer diameter of the connecting plug 77 is gradually shrunk to the maximal variable, the width of the original trapezoidal opening slot is changed to be minimal, at this moment, the trapezoidal convex rib is shrunk into the opening slot with the minimal width to generate an axially slidable fit state therewith, thus the connecting plug 77 can be separated outwards from the connecting socket sleeve 7 with fixed diameter.

The proposal of the drum-shaped structure on the superposing form in a height direction is the same as the aforementioned principle.

Figure 12:
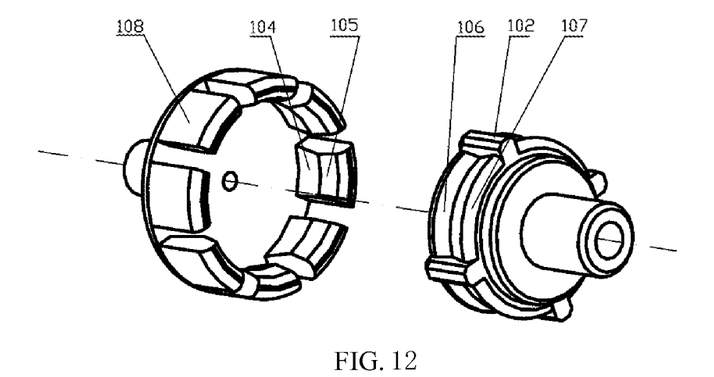
FIG. 12 is a schematic diagram of the structure of the drum-shaped connector having a semi-drum-shaped structure in one embodiment of the present invention.

FIG. 12 is a schematic diagram of the structure of the drum-shaped connector, with a half-height drum-shaped structure superposed, in one embodiment of the present invention, in which a drum-shaped connecting plug 106 is a drum-shaped structure with full height, and a drum-shaped connecting plug 107 is a drum-shaped structure with half height and is jointed with a drum-shaped connecting socket sleeve 108 in this figure, the half-height drum-shaped part of the connecting plug 107 acts only on the stability of the locking between the connecting socket sleeve and the connecting plug in this figure, but has no enhancement on the locking function of the connecting socket sleeve.

Figure 13:
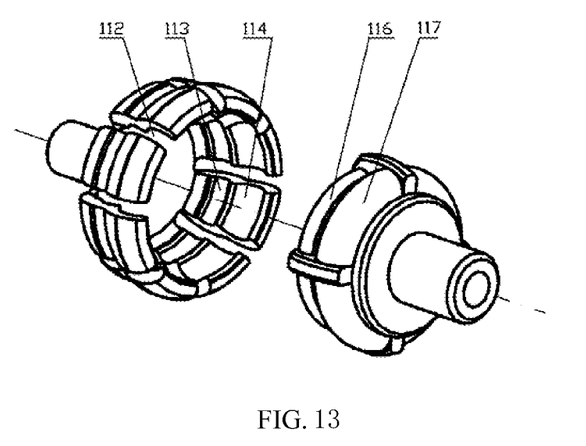
FIG. 13 is a schematic diagram of the structure of the drum-shaped connector having a double-drum-shaped structure in one embodiment of the present invention.
Figure 14:
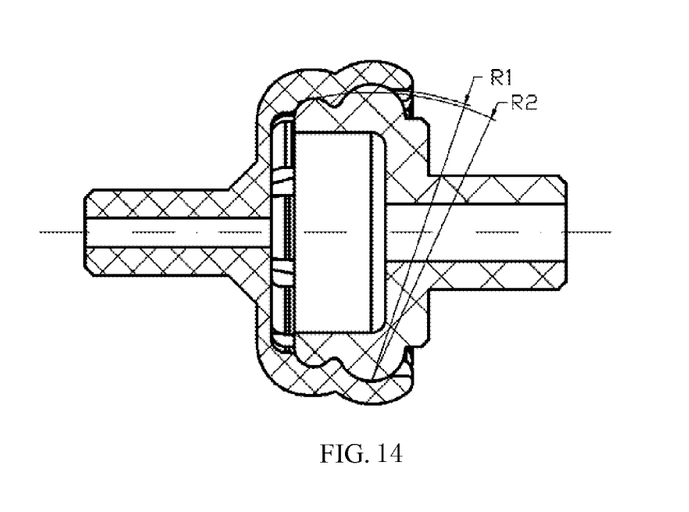
FIG. 14 is a schematic diagram of the longitudinal section structure of the drum-shaped connector having a double-drum-shaped structure in one embodiment of the present invention.

FIG. 13 is a schematic diagram of the structure of two superposed drum-shaped connectors with the same diameter in one embodiment of the present invention. FIG. 14 is a schematic diagram of the longitudinal section of the two superposed drum-shaped connectors with the same diameter, shown as FIG. 13 and FIG. 14, one drum-shaped structure 127 having the larger-diameter cross section and another drum-shaped structure 126 having the smaller-diameter cross section are superposed in a height direction, and R1 is a circular arc line having the radius from the center of circle A to the opening of the larger-diameter drum-shaped socket sleeve in FIG. 14; and R2 is a circular arc line having the radius from the center of circle A to the maximal diameter part of the smaller-diameter drum-shaped structure 126 in FIG. 14. In such a proposal of superposed structure, R2 is smaller than R1, so when the propeller is impacted, the connecting plug is separated outwards from the connecting socket sleeve under the action of a prying moment taking a point specified by an array A as pivot, and for the same reason, the connecting plug can be separated outwards from the connecting socket sleeve at a time, so this structure has the same basic functions as the proposals shown as the aforementioned schematic diagrams.

Figure 15:
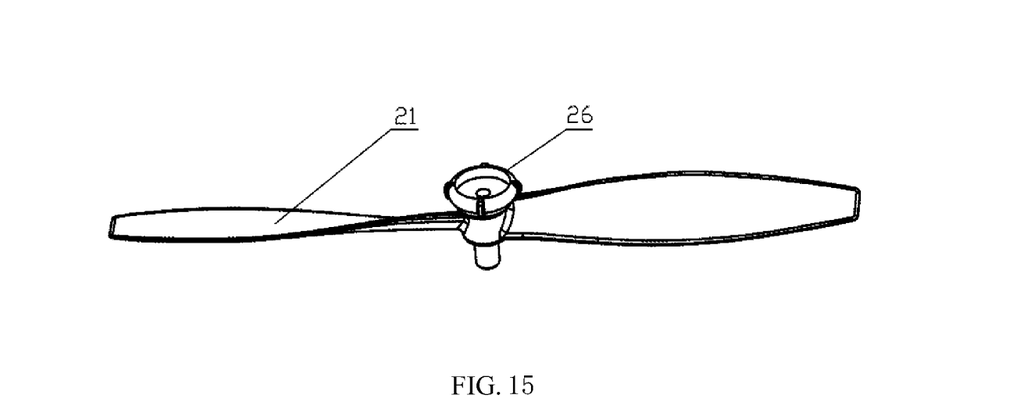
FIG. 15 is a schematic diagram of the integrally injection-molded structure of the propeller and the connector connected with the propeller in one embodiment of the present invention.
Figure 16:
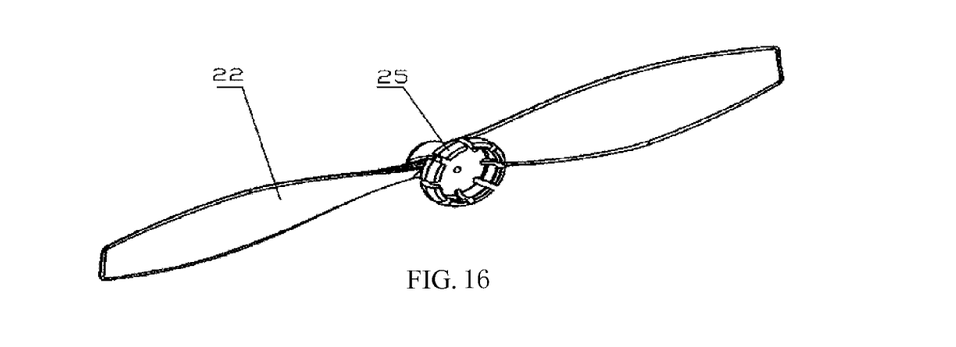
FIG. 16 is a schematic diagram of the integrally injection-molded structure of the propeller and the other connector connected with the propeller in another embodiment of the present invention

The propellers of a majority of motor-powered small-sized model airplanes are manufactured by plastic injection molding, the connector having the propeller protecting function can be integrally injection-molded with the propeller to form a novel propeller product. FIG. 15 shows the integrally injection-molded structure of a propeller 21 and a connecting plug 26, and FIG. 16 shows the integrally injection-molded structure of a propeller 22 and a connecting socket sleeve 25.

Figure 17:
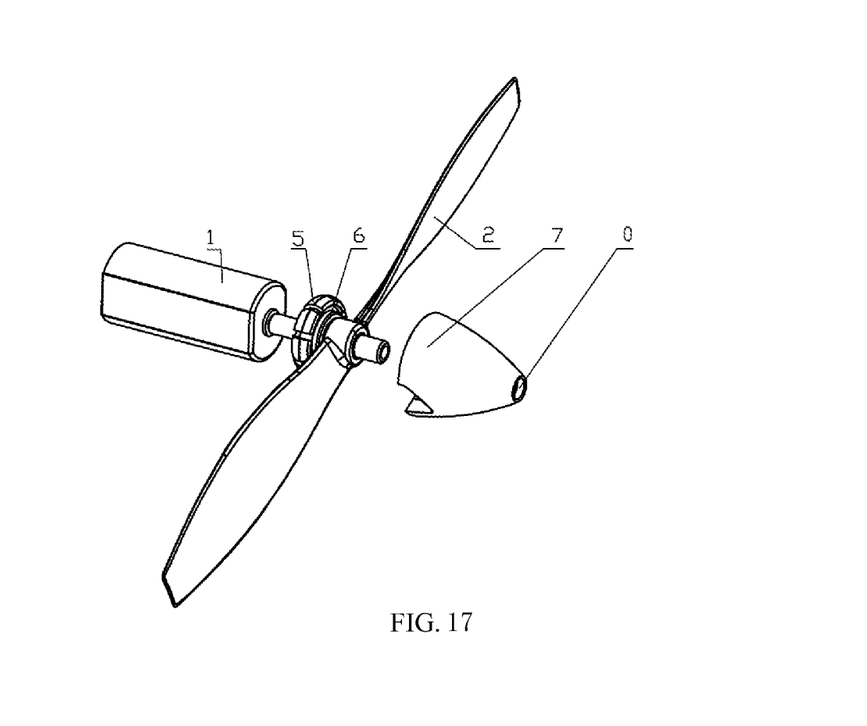
FIG. 17 is an exploded schematic diagram of the assembly of the model airplane having the propeller protecting connectors in one embodiment of the present invention.

FIG. 17 is an exploded schematic diagram of the assembly of the power system of the electric power model airplane including propeller protecting connectors 5, 6, a propeller 2 and a fairing 7 in one embodiment of the present invention.

Introduction to the test condition of propeller connectors and a motor having the propeller protecting function: the shape is just as the combination of the connectors in FIG. 2, and basic data is as follows: the maximal inner diameter of the connecting socket sleeve is 10mm, when the propeller is impacted, the moment required by separating the connecting plug from the connecting socket sleeve is 550 to 600g/cm, and the maximal axial pulling-out force of the connecting plug is 1800g. The test is conducted on a remote-control N50-motor-powered model airplane having the weight of 65g, the wingspan of 500mm and the diameter of 107mm for a front-mounted propeller. During various flying movements of the model airplane, such as climbing, sharp turn, level flight and steep descent, the connectors having the propeller protecting function can guarantee normal operation of the propeller, and no matter whether the model airplane lands on rough meadow or flat cement road, the propeller will be separated from the motor the moment the propeller collides with cement road surface, meadow or branches, thus the propeller is protected effectually and the damage to the motor and the model airplane is avoided. However, under the condition of the same model airplane and flying field, the propeller is directly fixed with the motor power output shaft of the model airplane, so the propeller of the model airplane will be bent or broken when the propeller collides with cement road surface, trips over meadow or is impacted by branches in the process of landing, and this generally causes the motor output shaft to be bent, and accordingly, to be out of work.

While the present invention is described with reference to embodiments, those ordinary skilled in this art would understand that, many modifications and variations can be made to the present invention without departing from the spirit and essence of the present invention, and the scope of the present invention shall be defined by claims attached.

We claim:

1. A propeller connecting piece for electric model airplane, for connecting an electric-power output shaft with a propeller in an electric model airplane with the propeller, characterized in that the propeller connector comprises two connectors, wherein one of the connectors is connected with the electric-power output shaft of the model airplane, and the other connector is connected with the propeller of the model airplane, one of the two connectors is an elastic component provided with an opening slot, and the two connectors are coaxially connected and can rotate together, but can be separated from each other when impacted by external force, and;

wherein one of the two connectors has an inner cavity shaped as a drum, the maximal diameter of the cross-sectional circumcircle at the middle of the drum-shaped inner cavity is larger than those of the cross-sectional circumcircles at the bottom and the opening, and the other connector is shaped to be tightly enclosed by the inner cavity of the connector.

2. The propeller connecting piece for electric model airplane according to claim 1, characterized in that one of the two connectors is provided with a convex rib(s) corresponding to the opening slot on the other connector, and the number of the convex rib(s) is at least one and at most equal to the number of the opening slot(s) on the other connector; when the two connectors are connected with each other, the convex rib is embedded into the opening slot so that the two connectors can be located and connected instead of rotating relatively, thus torque transfer between the electric power output shaft and the propeller is completed; axially slidable fit state is formed between the convex rib and the opening slot, so the convex rib slides from the interior of the opening slot to the opening of the opening slot and is then separated from the opening slot when the two connectors are separated from each other under external force.

3. The propeller connecting piece for electric model airplane according to claim 2, characterized in that one of the two connectors has an inner cavity shaped as two connected drums, the diameter of the cross-sectional circumcircle at the middle of each drum-shaped inner cavity is larger than those of the cross-sectional circumcircles at the bottom and the opening, and the other connector is shaped as double drums that can be tightly enclosed by the inner cavity of the connector.

4. The propeller connecting piece for electric model airplane according to claim 3, characterized in that the width at the opening of the opening slot is larger than or equal to that at the other end of the opening slot, and the shape of the convex rib is matched with the opening slot.

5. The propeller connecting piece for electric model airplane according to claim 2, characterized in that the cross sections of the two connectors are centrosymmetrical.

6. The propeller connecting piece for electric model airplane according to claim 2, characterized in that the connector connected with the propeller is integrally injection-molded with the propeller.

7. The propeller connecting piece for electric model airplane according to claim 1 characterized in that the cross sections of the two connectors are centrosymmetrical.

8. The propeller connecting piece for electric model airplane according to claim 7, characterized in that the cross sections of the two connectors are round, elliptical or polygonal.

9. The propeller connecting piece for electric model airplane according to claim 8, characterized in that when the cross section is polygonal, the opening slot of the connector is located at the corner or sideline.

10. The propeller connecting piece for electric model airplane according to claim 1 characterized in that the connector connected with the propeller is integrally injection-molded with the propeller.

11. The propeller connecting piece for electric model airplane according to claim 10, characterized in that the model is a motor-powered model airplane.

* * * * *